United States Patent Office 3,253,887
Patented May 31, 1966

3,253,887
AMMONIA SYNTHESIS CATALYST AND PROCESS
William Judson Mattox and William Floyd Arey, Jr.,
Baton Rouge, La., assignors to Esso Research and Engineering Company, a corporation of Delaware
No Drawing. Filed Aug. 3, 1962, Ser. No. 214,497
3 Claims. (Cl. 23—199)

The present invention is concerned with improved means for synthesizing ammonia. More particularly, it deals with the use of base exchanged alumino-silicate zeolites as catalysts for the synthesis of ammonia by the reaction of hydrogen and nitrogen.

The art is constantly seeking new methods of performing well known conversion processes. While recently the use of crystalline alumino-silicate zeolites for converting hydrocarbon oils has been suggested, it has now been found that certain crystalline alumino-silicate zeolites are effective ammonia synthesis catalysts. More particularly, large pore, i.e., effective pore diameters of 6 to 15 Angstroms, crystalline alumino-silicate zeolites which have been base exchanged with a metal cation so as to reduce the alkali metal (sodium) oxide content of said zeolite to less than 10 wt. percent, have been found to catalyze the reaction of hydrogen and nitrogen and thus form ammonia. The catalytic reaction may take effect under a wide variety of conditions. In general, suitable temperatures for the synthesis range from about 750° to 1300° F., preferably 900° to 1200° F., with pressures normally ranging from 50 to 1000 atmospheres, preferably 100 to 300 atmospheres. The reaction can take place under any of a wide variety of conditions, i.e. fixed bed, fluid bed, disperse phase, slurry, etc. Hourly space velocity may vary, but generally is of the order of 5,000 to 60,000, preferably 10,000 to 40,000 vols. per hour per volume of catalyst. As in conventional ammonia synthesis, while the molar ratio of nitrogen and hydrogen may vary it is generally desirable to utilize approximately a 2.5 to 3.5, especially a 3 to 1, molar ratio of hydrogen and nitrogen in view of equilibrium considerations.

The effect of temperature on the ammonia synthesis reaction is somewhat complex in that high temperatures diminish the theoretical limits of ammonia obtainable per pass but greatly accelerate the rate of ammonia formation. These two opposing effects make the choice of operating temperature an economic compromise. Usually, operation at relatively high temperatures is combined with high pressures and high flow rates, whereas the lowest possible temperatures are employed for operation as medium or low pressures and at moderate flow rates.

Crystalline metallic alumino-silicate zeolites, often loosely termed "molecular sieves," are well known in the art. They are characterized by their highly ordered crystalline structure and have pores of nearly uniform dimensions in the general range of about 3 to 15 Angstroms. These crystalline zeolites have an alumino-silicate anionic cage structure in which the alumina and silica tetrahedra are intimately connected to each other. Positive ions, e.g., metal cations or hydrogen, must be distributed through the structure to maintain electrical neutrality. The highly ordered dispersion of the alumina and silica tetrahedra makes for a large number of active sites and the uniform pore openings of the zeolites allow for easy ingress of certain molecular structures.

Naturally occurring examples of a large pore sieve, i.e., effective pore diameter of 6 to 15 Angstroms, are the minerals faujasite and mordenite. Recently, synthetic mordenite and the hydrogen form of mordenite, which have effective pore diameters of about 10 Angstroms, have become available in increased quantity (see Chem. & Engr. News, March 12, 1962). Synthetically produced alumino-silicate zeolites having large pore diameters have been termed in the industry as Type 13 molecular sieves, e.g., "13X" and "13Y" molecular sieves. In general all the above crystalline alumino-silicate zeolites as formed contain a substantial portion of an alkali metal, normally sodium.

The catalysts of the present invention are such crystalline alumino-silicate zeolites having effective pore diameters of about 6 to 15 Angstroms, preferably 7 to 13 Angstroms, wherein a substantial portion of the alkali metal, e.g., sodium, has been replaced with a metal cation so as to reduce the soda content ($Na_2O$) to less than 10 wt. percent and preferably to about 2 to 6 wt. percent (based on zeolite). It has been found that neither the sodium form of the zeolite (there having been no base exchange) nor the hydrogen form (there having been no base exchange with a metal cation), nor a smaller pore zeolite, is effective as a catalyst for synthesizing ammonia. Thus, the present catalysts are formed by base exchanging the alkali metal form of the zeolite to replace a substantial portion of the alkali metal with other metal cations, particularly multivalent metal cations. Especially preferred are crystalline zeolites which contain substantial portions of Group I–B, II–A, III–A and VIII metal cations, mixtures of zeolites containing these particular cations or zeolites containing more than one cation. Zeolites which contain Group VI–B, VII–B, actinide, and lanthanide cations may also be used. Examples of suitable cations are the following: copper, silver; magnesium, calcium, strontium, barium; aluminum, gallium, molybdenum, tungsten; cobalt, nickel, iron, platinum, palladium, osmium, ruthenium, manganese, uranium, and cerium.

These catalysts are formed by exchanging the crystalline alumino-silicate zeolite with a suitable salt solution of the metals at a temperature normally of 60° to 150° F. via conventional ion exchange techniques. In general, at least two-thirds of the soda which may originally have been present in the zeolite is exchanged with the catalytic metal so that the resulting exchange alumino-silicate zeolites contain at least 1 to 2 wt. percent, preferably 3 to 20 wt. percent, of the metal as catalytic agent. The base exchange may be readily effected by contacting the crystalline alumino-silicate zeolite with a suitable salt solution, e.g., magnesium sulfate, calcium chloride, silver nitrate, etc. After base exchange, the resulting composition is normally washed free of soluble ions and subjected to drying at temperatures of 225° to 700° F. for periods of 1 to 12 hours. It may thereafter be calcined at temperatures of 500° to 1500° F., preferably 750° to 1000° F., for 1 to 2 hours.

Catalytic materials similar to that described in U.S. Patent 2,971,904 are suitable for the practice of the present invention and may readily be prepared from the above base exchanged zeolites by thereafter impregnating with a suitable metal. For example, platinum group metals such as palladium, platinum and rhodium and/or other metals such as molybdenum, chromium, vanadium, zirconium, etc., or one or more of the metals referred to above as suitable for cationic exchange, as well as compounds containing such metals, may be deposited on the base exchanged zeolite to give a catalytic material characterized by a substantial portion of the alkali having been replaced by a multivalent cation and which contains an additional metal deposited thereon. Such mixed metal forms of catalyst such as a platinum group metal deposited on a zeolite which has been base exchanged to contain a substantial portion of alkaline earth metal, e.g., magnesium, are particularly suitable for the practice of the present invention.

In general the chemical formula of the anhydrous form of the base exchanged large pore crystalline alumino-silicate zeolite employed in the present ammonia synthesis operation (neglecting any metal which may be deposited thereon) may be expressed in terms of moles as follows:

$$0.9 \pm 0.2 \frac{Me_2O}{n} : Al_2O_3 : XSiO_2$$

where Me represents a metal cation, the major molar proportion of which is a multivalent metal, preferably selected from Group I–B, II–A, III–A and VIII; $n$ is its valence, and X is a number from 2.5 to 14, preferably 3 to 10, and especially 4 to 6.

The various aspects and modifications of the present invention will be made more clearly apparent by reference to the following examples:

EXAMPLES 1 TO 15.—CATALYST PREPARATION

*Large pore sodium alumino-silicate zeolite Y–1:4.24 $SiO_2/Al_2O_3$ ratio*

A solution of 6,870 grams of 97% NaOH and 1,513 grams of sodium aluminate in 27 liters of water was added with stirring to 37.6 kg. of low soda Ludox (30% $SiO_2$; weight ratio $Na_2O/SiO_2$ 1:285) contained in a 20-gallon porcelain crock. Stirring was continued until the mixture was homogeneous. The slurry was then transferred to a 72-liter round-bottom flask with a reflux condenser and was heated to 176° to 204° F. for 48 hours to effect crystallization. The bulk of the aqueous layer was decanted and the crystalline material separated from the remainder of the solution by filtration. The sodium alumino-silicate was washed until the wash water had a pH of 9.3 and analyzed, after drying, 14% $Na_2O$, 58.6% $SiO_2$, and 23.4% $Al_2O_3$. On a mole basis this analysis corresponds to:

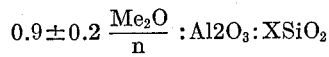
0.99 $Na_2O$:1.00$Al_2O_3$:4.24 $SiO_2$

*Large pore sodium alumino-silicate zeolite Y–2:5.2 $SiO_2/Al_2O_3$ ratio*

This synthetic sodium alumino-silicate was prepared with the following proportions of reagents. A solution of 300 grams of NaOH and 85 grams of sodium aluminate in 1075 cc. of water was added with stirring to 1930 grams of low soda Ludox contained in a 2-gallon porcelain crock. Stirring was continued until the mixture was homogeneous and then heated to 210° to 215° F. for 5½ days to effect crystallization. The aqueous layer was decanted and the crystalline material filtered and water-washed until the wash water had a pH of 9.5. This sodium form of the catalyst analyzed, after oven drying, 13.5 wt. percent $Na_2O$, 63.6% $SiO_2$, and 20.8% $Al_2O_3$. On a mole basis this corresponds to:

1.07 $Na_2O$:1.00$Al_2O_3$:5.19 $SiO_2$

*Other metal alumino-silicate zeolites*

Portions of the above sodium alumino-silicates Y–1 and Y–2 were converted to various other metal forms by contacting the powdered silicate with an aqueous solution of the metal salt, such as the chloride, sulfate, etc., at a temperature of 80° to 150° F. for 30 minutes to two hours. After filtration, a fresh metal salt solution was added and the treatment repeated. Usually, three such cationic exchanges replaced about two-thirds of the soda. After the last exchange, the catalyst was washed free of soluble salts and oven dried at 250° to 300° F. The powdered material was pilled and then calcined at 800° to 1000° F. before use.

*Hydrogen-alumino-silicate zeolites*

The ammonium form was prepared from sodium alumino-silicates Y–1 and Y–2 by cationic exchange with an ammonium ion-containing solution at 80° F. and then decomposed to the hydrogen form by heating the oven dried material in air according to the following schedule:

| Hours heated: | Temp., ° F. |
|---|---|
| 16 | 450 |
| 4 | 600 |
| 2 | 750 |
| 2 | 1000 |

*Zn-hydrogen alumino-silicate zeolite Y–1*

This alumino-silicate was prepared by first exchanging the sodium form of zeolite Y–1 three times with zinc chloride solution and then exchanging the washed (chloride-free) zinc form (one time) with ammonium chloride solution. The resulting Zn–$NH_4$-alumino-silicate was washed free of chloride ion, oven dried at 275° F., and finally decomposed to the Zn-H-form by heating in air according to the schedule shown above for the hydrogen form. It is noted that the zinc was present as an exchangeable ion.

*Palladium-hydrogen alumino-silicate zeolite Y–2*

Sodium alumino-silicate Y–2 was oven dried and then cationic exchanged with an aqueous ammonium chloride solution, which contained $NH_4OH$ to reduce the acidity, to produce ammonium-form of zeolite Y–2 with a soda content of about 2%. Palladium (0.5% Pd) was then deposited on the $NH_4$ zeolite by slurrying the sieve in a solution of $Pd(NH_3)_4Cl_2$. The catalysts were then oven dried and finally calcined in dry air by gradually increasing the temperature during several hours to 950° F. and then holding at this level for two hours.

*Platinum-hydrogen alumino-silicate zeolite Y–2*

This alumino-silicate was prepared by a procedure similar to that used for the above Pd-H form. The platinum (0.6%) was added as $H_2PtCl_6$ and the calcining schedule was the same as was used for the H form of zeolite Y–2.

*Pd-Mg and Pt-Mg-aluminia-silicate zeolite Y–1*

The magnesium form of alumino-silicate Y–1 was prepared as described above for metal alumino-silicates and then impregnated with an aqueous solution of $PdCl_2$ or $H_2PtCl_6$.

*Large pore Ni-Mg alumino-silicate zeolite X*

This catalyst was prepared by cationic exchange of alumino-silicate X with an aqueous solution containing equal molal proportions of $NiCl_2$ and $MgCl_2$. Alumino-silicate zeolite X is sold commercially and may be represented by the following formula:

1.0 $Na_2O$:1.0$Al_2O_3$:2.7 $SiO_2$

*Small pore magnesium alumino-silicate zeolite A*

This catalyst was prepared by cationic exchange of alumino-silicate A with an aqueous solution of $MgSO_4$. Alumino-silicate zeolite A is sold commercially and may be represented by the following formula:

1.0 $Na_2O$:1.0$Al_2O_3$:2.0 $SiO_2$

The magnesium alumino-silicate zeolite A had an effective pore diameter of about 4 to 5 Angstroms.

The above alumino-silicates are listed in the following tabulation together with $SiO_2/Al_2O_3$ ratios, residual soda content, metal content, etc.

TABLE I.—ALUMINO-SILICATES EVALUATED FOR AMMONIA SYNTHESIS

| Example | Form | Exchange Salt | $SiO_2/Al_2O_3$ Ratio | Weight Percent $Na_2O$ | Weight Percent Metal |
|---|---|---|---|---|---|
| 1 | Na | None | 5.2 | 13.5 | |
| 2 | Ca | $CaCl_2$ | 5.2 | 4.9 | 5.2% Ca. |
| 3 | Al | $AlCl_3$ | 5.2 | 4.8 | 2.5% Al.[1] |
| 4 | Pt-H form | | 5.2 | 4.7 | 0.6% Pt. |
| 5 | Pd-H form | | 5.2 | 2.0 | 0.5% Pd. |
| 6 | Mg | $MgCl_2$ | 4.2 | 4.7 | 3.6% Mg. |
| 7 | H form | | 4.2 | 3.9 | |
| 8 | Zn-H form | $ZnCl_2$ | 4.2 | 3.9 | |
| 9 | Co | $CoCl_2$ | 4.2 | 3.4 | 4.1% Co. |
| 10 | Cu | $CuCl_2$ | 4.2 | 3.0 | 13.8% Cu. |
| 11 | Ag | $AgNO_3$ | 4.2 | 0.07 | 34.6% Ag. |
| 12 | Pd on Mg form | $MgCl_2$ | 4.2 | 5.5 | 0.8% Pd; 2.4% Mg. |
| 13 | Pt on Mg form | $MgCl_2$ | 4.2 | 5.5 | 0.6% Pt; 3.5% Mg. |
| 14 | Ni on Mg form | $MgCl_2$-$NiCl_2$ | 2.7 | 5.1 | 10.6% Ni; 0.5% Mg. |
| 15 | Mg | $MgSO_4$ | 2.0 | 11.4 | 3.7% Mg. |

[1] Exchanged aluminum.

*Catalyst evaluation*

The above catalysts were pre-reduced with hydrogen and were then evaluated for ammonia synthesis in continuous flow, laboratory experiments at 1000 p.s.i.g. and 800° to 900° F. with a 3/1 mol ratio of $H_2$ and $N_2$. Although this pressure is not the most favorable for the reaction and is considerably lower than that used for commercial operations, equilibrium conversions of about 15% could be expected and are adequate for laboratory comparisons. The ability of the various materials tested to catalyze the synthesis of ammonia was determined in the following manner:

The pressure of the off-gases from the synthesis unit was reduced to atmospheric and the gas stream passed into a series of two adsorbers which contained dilute $H_2SO_4$. After four hours of operation, the acid solution was removed from the scrubbers and analyzed by chemical methods to determine the ammonia content. The results of these tests are summarized in the following table, the number in parenthesis indicating the zeolite example indicated in Table I:

alumino-silicate zeolite which had been base exchanged with a suitable metal cation. This is clearly shown in Table III which sets forth the relative activity of various catalysts previously described, the activity of magnesium exchanged zeolite Y (Example 6) being taken as 1.

TABLE III

| Metal form | Relative activity |
|---|---|
| Mg | 1.00 |
| Pd-H | 0 |
| Pd-Mg | 4.29 |
| Ni-Mg | 1.43 |
| Pt-H | 0 |
| Pt-Mg | 1.43 |

As shown in Table III impregnating a large pore zeolite, which has been base exchanged with a multivalent ion, with a Group VIII metal, e.g., platinum, palladium, nickel, etc., gives substantially improved activity as compared with the use of a simply base exchanged zeolite. By way of contrast, Group VIII metals deposited on a zeolite which had been based exchanged so as to give the hydrogen form of zeolite showed substantially no activity.

Various modifications may be made to the present invention. For example, the lithium and potassium-form zeolites may be used in the preparation of these catalysts rather than the sodium-form. These alkali metal oxide zeolites may be synthesized direct or they may be pre-

TABLE II.—AMMONIA SYNTHESIS WITH CRYSTALLINE ALUMINO-SILICATE CATALYSTS

[$H_2/N_2$ mol ratio, 3/1; temperature, 800°–900° F.; pressure, 1000 p.s.i.g.; hourly space velocity, 6000]

| Cation from Group | I-A | I-B | II-A | II-B | III-A | VIII |
|---|---|---|---|---|---|---|
| Active Catalysts (All large pore) | | Cu (10), Ag (11) | Mg (6), Ca (2) | | Al (3) | Co (9), Ni-Mg (14), Pd-Mg (12), Pt-Mg (13), |
| Inactive Catalysts | H (7), Na (1) | | Mg form of small pore zeolite (15). | Zn-H (8) | | Pt-H (4), Pd-H (5). |

It is thus seen that large pore crystalline metallic alumino-silicates characterized by the replacement of alkali metal with various multivalent cations are active in promoting ammonia synthesis. Particularly desirable are crystalline alumino-silicates containing as an exchangeable cation metals from Groups I-B, II-A, III-A, and VIII as well as mixtures thereof. It is noted that simply replacing the alkali metal with hydrogen did not give a material suitable for catalyzing the reaction between hydrogen and nitrogen to form ammonia. Moreover, the use of a small pore zeolite, even after metal cation exchange, fails to catalyze the reaction to ammonia.

Additionally, the above results show enhanced activity by the use of a mixed metal form of zeolite, i.e. a platinum group metal deposited on a large pore crystalline pared by exchange of the sodium zeolite. Appropriate quantities of residual K and Li in the multivalent metal cation exchanged zeolite may be found more beneficial than residual sodium in promoting catalyst activity. In addition to the singly and doubly exchanged and/or impregnated zeolites, triply or other multiple promoted crystalline zeolites may be employed as ammonia synthesis catalysts.

Having described the present invention, that which is sought to be protected is set forth in the following claims.

What is claimed is:

1. An improved process for synthesizing ammonia which comprises reacting nitrogen with hydrogen under ammonia synthesis conditions in the presence of a crystalline alkali metal alumino-silicate zeolite having an effective pore diameter of 6 to 15 Angstroms and which has a metal cation selected from the group consisting of aluminum, cobalt, copper, silver, calcium, and magnesium base exchanged for alkali metal in the zeolite so that the zeolite contains less than 10 wt. percent of alkali metal oxide.

2. An improved process for synthesizing ammonia which comprises reacting nitrogen with hydrogen under ammonia synthesis conditions in the presence of a crystalline sodium alumino-silicate zeolite having an effective pore diameter of 6 to 15 Angstroms, said zeolite containing magnesium base exchanged for sodium in the zeolite so that the zeolite contains less than 10 wt. percent sodium oxide and being impregnated with a metal selected from the group consisting of nickel, palladium and platinum.

3. In a process for synthesizing ammonia by reaction of hydrogen with nitrogen under ammonia synthesis conditions at a temperature in the range of 750° to 1300° F. and a pressure of 50 to 1000 atmospheres, the improvement which comprises reacting the hydrogen with the nitrogen in the presence of a crystalline sodium alumino-silicate zeolite having an effective pore diameter of 6 to 15 Angstroms, said zeolite containing magnesium base exchanged for sodium so that the zeolite contains less than 10 wt. percent sodium oxide and being impregnated with palladium to catalyze the reaction.

References Cited by the Examiner
UNITED STATES PATENTS

| | | | |
|---|---|---|---|
| 1,926,099 | 9/1933 | Jaeger | 23—198 |
| 3,013,987 | 12/1961 | Breck et al. | 252—455 |
| 3,013,990 | 12/1961 | Breck et al. | 252—455 |

BENJAMIN HENKIN, *Primary Examiner.*

MAURICE A. BRINDISI, *Examiner.*

E. C. THOMAS, *Assistant Examiner.*